United States Patent [19]

Tazi et al.

[11] Patent Number: 4,900,809

[45] Date of Patent: Feb. 13, 1990

[54] PROCESS OF RENDERING COPOLYMERS OF MALEIC ANHYDRIDE AND ALKYL VINYL ETHERS PREPARED IN BENZENE SOLVENT SUBSTANTIALLY BENZENE-FREE

[75] Inventors: Mohammed Tazi, Wayne; Robert B. Login, Oakland; Nikhil Kundel, Piscataway, all of N.J.

[73] Assignee: GAF Chemicals Corporation, Wayne, N.J.

[21] Appl. No.: 322,453

[22] Filed: Mar. 13, 1989

[51] Int. Cl.$^4$ .......................... C08F 6/24; C08F 222/06
[52] U.S. Cl. ................................ 528/497; 528/501; 526/271; 521/98; 521/149
[58] Field of Search ................ 528/497, 498; 526/271, 526/332; 521/98, 149

[56] References Cited

U.S. PATENT DOCUMENTS 3,632,561 1/1972 Gibb .............................. 526/271 X
4,532,320 7/1985 Denzinger et al. ................. 528/498

FOREIGN PATENT DOCUMENTS 3425125 1/1986 Fed. Rep. of Germany ...... 528/497

Primary Examiner—Joseph L. Schofer
Assistant Examiner—F. M. Teskin
Attorney, Agent, or Firm—Walter Katz; Marilyn J. Maue; Joshua J. Ward

[57] ABSTRACT

Substantially benzene-free copolymers of maleic anhydride and alkyl vinyl ethers having benzene present in an amount of less than about 1 ppm and an alkyl-substituted aromatic hydrocarbon present in an amount of about 2.0 wt. % or less, and a process for rendering a copolymer reaction product of maleic anhydride and an alkyl vinyl ether prepared in benzene solution substantially benzene-free, is described herein.

20 Claims, 1 Drawing Sheet

PROCESS OF RENDERING COPOLYMERS OF MALEIC ANHYDRIDE AND ALKYL VINYL ETHERS PREPARED IN BENZENE SOLVENT SUBSTANTIALLY BENZENE-FREE
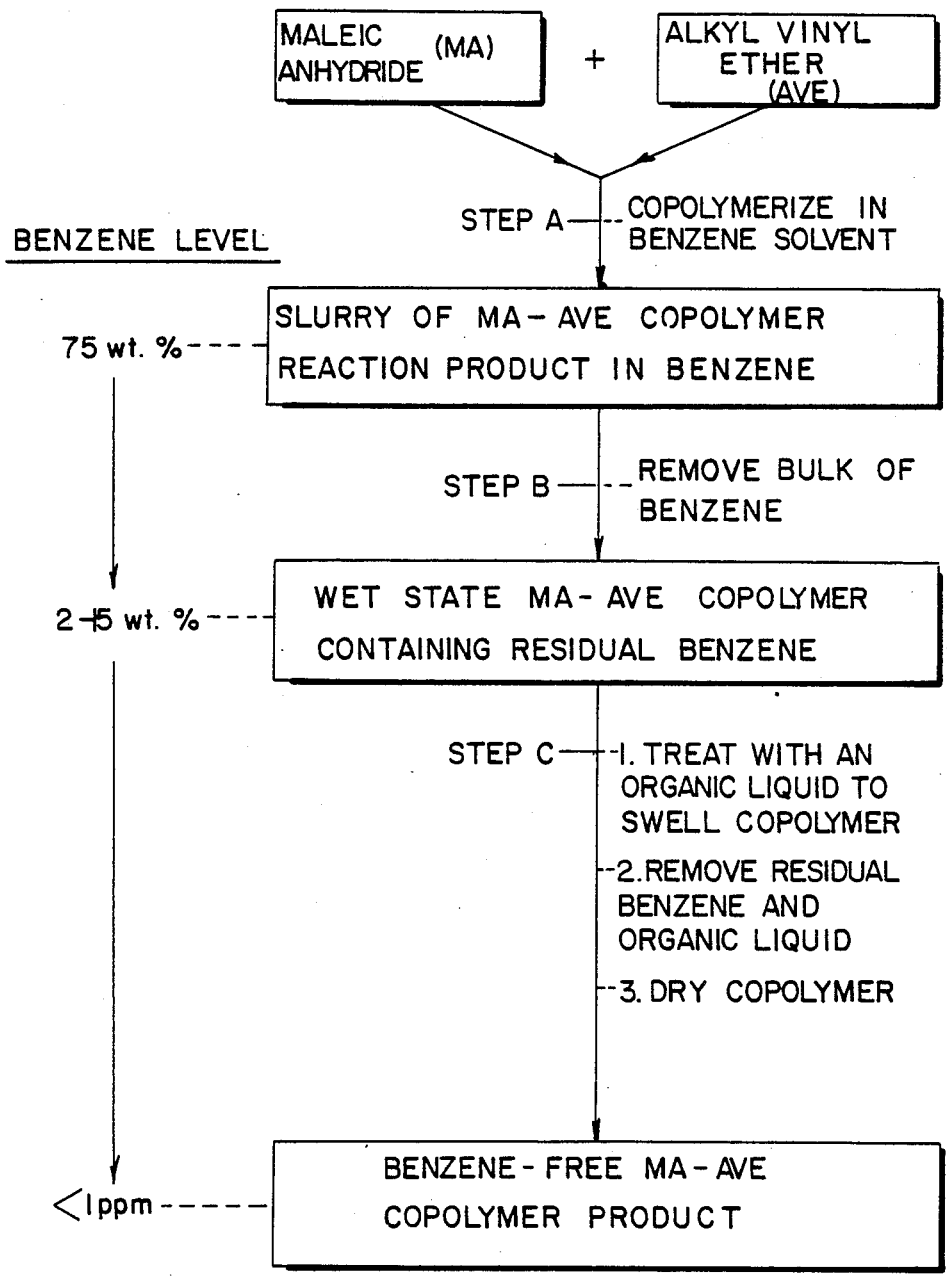

PROCESS OF RENDERING COPOLYMERS OF MALEIC ANHYDRIDE AND ALKYL VINYL ETHERS PREPARED IN BENZENE SOLVENT SUBSTANTIALLY BENZENE-FREE

BACKGROUND OF THE INVENTION

1. Field of the Invention

This invention relates to copolymers of maleic anhydride and alkyl vinyl ethers prepared in benzene solvent, and, more particularly, to a process of rendering such copolymers substantially benzene-free, and to products produced thereby.

2. Description of the Prior Art

High molecular weight copolymers of maleic anhydride and alkyl vinyl ethers, e.g. $C_1$–$C_5$ alkyl vinyl ethers, such as methyl vinyl ether, are prepared advantageously by precipitation polymerization in benzene solvent because of its very low chain transfer effect, in which the monomers are soluble but the copolymer is insoluble. Such copolymers, and their half-esters, hydrolyzed free acid and salts, find wide commercial use in adhesives, coatings, pharmaceuticals, hairsprays, thickeners, protective colloids, detergents and denture adhesives. However, benzene is not desired in the final product, it can be removed by hydrolysis of the product in water followed by azeotropic distillation. Benzene is more difficult to remove from the anhydride form of the polymer. Generally, such removal procedures have involved drying the benzene-containing copolymers at relatively high temperatures and for long periods of time. Unfortunately, the remaining benzene content of the anhydride copolymer still is about 1–3% by weight.

U.S. Pat. No. 4,532,320 describes a process for removal of physiologically unacceptable solvents such as benzene from polymers containing anhydride groups, such as copolymers of maleic anhydride and methyl vinyl ether. This process comprises heating the dry copolymer powder in an aliphatic hydrocarbon such as nonane or decane at a temperature which is at or above the glass transition temperature of the copolymer, e.g., at 161° C. for a treatment mixture of equal parts of nonane and decane (see Example 7 of the patent). However, the final benzene content in the treated copolymer was 0.03 wt. %, or 300 ppm, which is still an objectional amount. One ppm or less is considered benzene-free.

Accordingly, an object of this invention is to provide a process of rendering copolymers of maleic anhydride and alkyl vinyl ethers prepared in benzene solvent substantially benzene-free in the anhydride form.

A particular object herein is to provide such copolymers having benzene present in an amount of less than 1 ppm and which are otherwise acceptable from a physiological standpoint.

SUMMARY OF THE INVENTION

What is described herein are substantially benzene-free copolymers of maleic anhydride and alkyl vinyl ethers having benzene present in an amount of less than 1 ppm and an alkyl-substituted aromatic hydrocarbon present in an amount of 2.0 wt. % or less.

The invention herein also includes rendering a copolymer reaction product of maleic anhydride and an alkyl vinyl ether prepared in benzene solution substantially benzene-free. The process of the invention comprises treating the copolymer reaction product in the wet state with an organic liquid which can swell the copolymer and release residual benzene therefrom. In a preferred form of the invention, the organic liquid is an alkyl-substituted aromatic hydrocarbon such as toluene which can extract benzene from the wet state copolymer but otherwise is non-aggressive towards the copolymer.

BRIEF DESCRIPTION OF THE DRAWINGS

The FIGURE is a flow chart of the process steps of the invention.

DETAILED DESCRIPTION OF THE INVENTION

Referring to the flow chart, the process of the invention is illustrated by Steps A through C which produce a substantially benzene-free copolymer of maleic anhydride and an alkyl vinyl ether.

Step A

In this step, the copolymer is made by precipitation polymerization of maleic anhydride and a $C_1$–$C_5$ alkyl vinyl ether in benzene solution. Generally these copolymers contain about 50 mole % of maleic anhydride and are of high molecular weight, characterized by specific viscosities above 2.0, generally in the range of about 2.6 to 3.5, as measured in 2-butanone solution, although both low and medium range molecular weight copolymers are considered within the purview of the invention.

The polymerization reaction preferably is carried out at about 80° C. or below, and most preferably at about 40°–75° C., in the presence of a polymerization initiator, such as a peroxide, a hydroperoxide, an azo compound or a redox catalyst, or a mixture thereof, for about 4–5 hours.

The benzene solvent usually is present during the polymerization at a level of about 75% by weight of the reaction mixture.

The reaction product appears as a slurry of solid copolymer suspended in benzene.

Step B

The bulk of the benzene medium in the slurry then is removed by filtration, centrifugation, or decantation and/or stripping distillation under reduced pressure.

At this point in the process, the copolymer is present in a wet state and contains about 2–15 wt. % of residual benzene. This amount of benzene appears both on the surface of the copolymer and within its polymer chains.

Conventional drying of a wet state copolymer can remove benzene from its surface but it has little or no effect upon benzene entrapped within polymer chains. Furthermore, if the wet state copolymer is dried to a powder, entrapped benzene cannot thereafter be removed by further drying or other treatment, such as that described in the aforementioned patent. In this invention too, it is essential that the copolymer remain in the wet state so that the entrapped benzene solvent in the copolymer also can be removed.

Step C

In this step, the wet state copolymer is contacted with an organic liquid which can remove residual benzene from the copolymer. The organic liquid functions by swelling the copolymer and extracting benzene entrapped within the polymer chains, and by dissolving benzene present on the surface of the copolymer.

Optionally, treatment with the organic liquid can take place during Step B, that is, while the bulk of the benzene is being removed, e.g., by stripping.

The organic liquid suitably is (1) capable of effectively swelling the copolymer to release benzene therein, (2) miscible with benzene, (3) non-aggressive towards the copolymer, i.e., the copolymer is insoluble in the organic liquid and is otherwise unaffected by its presence, (4) preferably, has a boiling point above, but not excessively higher than, that of benzene, and (5) is environmentally and physiologically acceptable in small amounts in the final product.

Suitable organic liquids include alkyl-substituted aromatic hydrocarbons, e.g., toluene, xylenes and cumenes. Toluene is preferred.

The organic liquid usually is added in an amount of about 4–10 parts per part of copolymer present and the mixture is refluxed for 1–24 hours.

After treatment with the organic liquid, both residual benzene and the treating organic liquid are removed from the copolymer, preferably by distillation, whereupon benzene (b.pt. 80° C.) is removed first, followed by the organic liquid (e.g., toluene, b.pt. 110° C.) This treatment may be repeated several times, if necessary, to reduce the benzene content to a desired level.

Finally, the copolymer may be dried, suitably in a forced-air drier, or similar apparatus, generally overnight at 60° C.

The maleic anhydride alkyl vinyl ether copolymer product thus obtained is substantially benzene-free, that is, it has a benzene content of less than 1 ppm, and an organic liquid content of about 2.0 wt. % or less.

This invention now will be described with reference to the following examples.

EXAMPLES

Step A

Preparation of Slurry of Copolymer of Maleic Anhydride-Methyl Vinyl Ether in enzene Maleic anhydride, 73.6 g, is charged into a 1-1 pressure reactor with benzene, 480 g, as a solvent. The system is purged three times with nitrogen and methyl vinyl ether, 65.3 g, is fed into the reactor over a period of 4 hours while the reaction mixture is kept at 70° C. Copolymerization of maleic anhydride and methyl vinyl ether is initiated with decanoyl peroxide, 0.178 g. After completion of the addition of methyl vinyl ether, the reaction mixture is held at 70° C. for 1 hour. The reaction product is discharged from the reactor in the form of a slurry of the copolymer in benzene; the specific viscosity of the copolymer as measured in a 2-butanone solution (1%) is 3.0.

Step B

Preparation of Wet State Copolymer of Maleic Anhydride-Methyl Vinyl Ether Containing Residual Benzene The copolymer slurry in benzene obtained in Step A is treated to remove the bulk of the benzene present. The following methods are employed separately or in combination for this purpose. (1) The bulk of the benzene is removed by decantation; (2) the slurry is heated to the boiling point of benzene and the solvent is stripped off under vacuum; and/or (3) the slurry is filtered and the wet cake is washed with toluene. After removal of the bulk of the benzene, the wet state copolymer contains 2–15% by wt. of benzene.

Step C

Preparation of Benzene-Free Maleic Anhdydride-Methyl Vinyl Ether Copolymer Product The wet state copolymer obtained in Step B is subjected to a treatment cycle consisting of (1) addition of a selected amount of toluene, for a given contact time, and at a predetermined temperature; and (2) stripping off of both benzene and toluene under vacuum. The resulting product is dried overnight in a forced air oven at 60° C.

Table below gives the results of carrying out this step under different experimental conditions.

TABLE

| | Process Conditions | | | | Copolymer Product | |
|---|---|---|---|---|---|---|
| Ex. No. | Copolymer: Toluene Wt. Ratio | Treatment Temperature | Contact Time (hrs) | No. of Cycles | Wt. % Toluene | Benzene (ppm) |
| 1 | 1:6 | Reflux | 4 | 2 | 0.7 | 1 |
| 2 | 1:4 | Reflux | 4 | 2 | 1.3 | 1 |
| 3 | 1:4 | Reflux | 2 | 2 | 1.5 | 1 |
| 4 | 1:4 | Reflux | 1 | 1 | 1.2 | 1 |

As shown in the Table above, the product obtained by toluene treatment of a wet state copolymer provides substantially a benzene-free maleic anhydride-methyl vinyl ether copolymer having less than 1 ppm of benzene and containing toluene in an amount of 2.0 wt. % or less.

While the invention has been described with respect to certain embodiments thereof, it will be understood that changes and modifications may be made which are within the shell of the art. Accordingly, it is intended to be bound only by the appended claims in which:

What is claimed is:

1. A process of rendering a copolymer reaction product of maleic anhydride and an alkyl vinyl ether prepared in benzene solvent substantially benzene-free which comprises treating the copolymer reaction product while in the wet state with an organic liquid which can swell the copolymer and release residual benzene therefrom.

2. A process according to claim 1 wherein said organic liquid is an alkyl-substituted aromatic hydrocarbon.

3. A process according to claim 2 wherein said organic liquid is toluene, xylene, or cumene.

4. A process according to claim 3 wherein said organic liquid is toluene.

5. A process according to claim 1 wherein said copolymer is contacted with said organic liquid during a predetermined period of time at a selected temperature sufficient to swell said copolymer and release benzene therefrom.

6. A process according to claim 1 wherein said process provides a copolymer product having benzene present in an amount of less than 1 ppm and said organic liquid present in an amount of 2.0 wt. % or less.

7. A process according to claim 1 which treatment also includes removing said swelling organic liquid and said residual benzene, and, thereafter, drying the copolymer.

8. A process according to claim 7 wherein said copolymer is treated several times with said organic liquid.

9. A process of rendering a copolymer reaction product of maleic anhydride and an alkyl vinyl ether prepared in benzene solvent substantially benzene-free which comprises:
  (a) copolymerizing maleic anhydride and an alkyl vinyl ether in benzene solvent to provide a slurry of a solid copolymer of maleic anhydride and said alkyl vinyl ether in benzene,
  (b) removing the bulk of the benzene solvent to provide copolymer in a wet state containing residual benzene,
  (c) treating the wet state copolymer with an organic liquid to swell the copolymer and release residual benzene therefrom,
  (d) removing residual benzene and said swelling liquid,
  (e) optionally, repeating steps (c) and (d), and
  (f) optionally, drying the thus-treated copolymer.

10. A process according to claim 9 wherein said alkyl vinyl ether is a $C_1$–$C_5$ alkyl vinyl ether.

11. A process according to claim 10 wherein said alkyl vinyl ether is methyl vinyl ether.

12. A process according to claim 12 wherein said organic liquid is an alkyl-substituted aromatic hydrocarbon.

13. A process according to claim 12 wherein said alkyl-substituted aromatic hydrocarbon is toluene, xylene, or cumene.

14. A process according to claim 13 wherein said alkyl-substituted aromatic hydrocarbon is toluene.

15. A process according to claim 9 wherein said copolymer is treated with said organic liquid during step (b).

16. A process according to claim 9 wherein said step (c) is carried out at a temperature and for a time sufficient to effect said desired swelling and release of said residual benzene.

17. A process according to claim 9 wherein step (d) is carried out by stripping under vacuum.

18. A process according to claim 9 wherein said substantially benzene-free copolymer is characterized by having benzene present in an amount of less than 1 ppm.

19. A process according to claim 9 wherein said copolymer is a high molecular weight copolymer characterized by having a specific viscosity of greater than 2.0 as measured in 2-butanone solution.

20. A process according to claim 19 wherein said specific viscosity is in the range of about 2.6 to about 3.5.

* * * * *